United States Patent
Kim et al.

(10) Patent No.: US 9,789,775 B2
(45) Date of Patent: Oct. 17, 2017

(54) SYSTEM AND METHOD FOR NOTIFYING NECESSITY OF HYDROGEN CHARGING USING RESULT OF MONITORING LOCATION OF HYDROGEN STATION

(71) Applicant: Hyundai Motor Company, Seoul (KR)

(72) Inventors: Sang Hyun Kim, Gyeonggi-do (KR); Chang Ho Kim, Gyeonggi-do (KR); Ji Hyun Shim, Seoul (KR); Hyung Ki Kim, Seoul (KR)

(73) Assignee: Hyundai Motor Company, Seoul (KR)

(*) Notice: Subject to any disclaimer, the term of this patent is extended or adjusted under 35 U.S.C. 154(b) by 92 days.

(21) Appl. No.: 14/867,043

(22) Filed: Sep. 28, 2015

(65) Prior Publication Data

US 2016/0137077 A1 May 19, 2016

(30) Foreign Application Priority Data

Nov. 13, 2014 (KR) ........................ 10-2014-0157817

(51) Int. Cl.
| | | |
|---|---|---|
| B60L 9/00 | (2006.01) | |
| B60L 11/00 | (2006.01) | |
| G05D 1/00 | (2006.01) | |
| G05D 3/00 | (2006.01) | |
| G06F 7/00 | (2006.01) | |
| G06F 17/00 | (2006.01) | |
| B60L 11/18 | (2006.01) | |
| G01C 21/34 | (2006.01) | |
| G01C 21/36 | (2006.01) | |

(52) U.S. Cl.
CPC ....... *B60L 11/1809* (2013.01); *B60L 11/1881* (2013.01); *G01C 21/3469* (2013.01); *G01C 21/3697* (2013.01)

(58) Field of Classification Search
CPC ............ B60L 11/1809; B60L 11/1881; G01C 21/3697; G01C 21/3469
USPC ....................................................... 701/1, 22
See application file for complete search history.

(56) References Cited

U.S. PATENT DOCUMENTS

| | | | |
|---|---|---|---|
| 7,693,651 B2 * | 4/2010 | Proefke | B60W 50/08 340/450.2 |
| 8,153,314 B2 * | 4/2012 | Umayahara | B60L 11/1881 429/429 |
| 8,504,236 B2 * | 8/2013 | Guo | G01C 21/3697 340/450.2 |

(Continued)

FOREIGN PATENT DOCUMENTS

| | | |
|---|---|---|
| KR | 10-2006-0069580 | 6/2006 |
| KR | 10-2009-0038316 | 4/2009 |

(Continued)

*Primary Examiner* — James Figueroa
(74) *Attorney, Agent, or Firm* — Mintz Levin Cohn Ferris Glovsky and Popeo, P.C.; Peter F. Corless

(57) ABSTRACT

A method is provided for notifying a driver that charging is required determined by utilizing the calculated remaining travel distance of the vehicle, the position information of the charging station and the position information about the destination. In particular, the method determines when the total travel distance in consideration of the destination exceeds the remaining travel distance of the vehicle. The driver is notified of the necessity for charging during the initial traveling, and before traveling beyond the rechargeable returning distance.

6 Claims, 1 Drawing Sheet

(56) References Cited

U.S. PATENT DOCUMENTS

| | | | | |
|---|---|---|---|---|
| 2003/0083848 A1* | 5/2003 | Kami | ............... | F17C 5/007 |
| | | | | 702/187 |
| 2004/0062963 A1* | 4/2004 | Umayahara | ......... | B60L 11/1881 |
| | | | | 429/429 |
| 2006/0185756 A1* | 8/2006 | Sato | ............... | B60S 5/02 |
| | | | | 141/94 |
| 2007/0090937 A1* | 4/2007 | Stabler | ............... | G07C 5/08 |
| | | | | 340/450.2 |
| 2009/0109022 A1* | 4/2009 | Gangopadhyay | .. | G01C 21/3679 |
| | | | | 340/540 |
| 2009/0157289 A1* | 6/2009 | Graessley | ............... | B60L 3/12 |
| | | | | 701/123 |
| 2010/0106401 A1* | 4/2010 | Naito | ............... | B60L 11/1809 |
| | | | | 701/533 |
| 2012/0111447 A1* | 5/2012 | Mori | ............... | F17C 5/06 |
| | | | | 141/4 |
| 2012/0116673 A1* | 5/2012 | Lee | ............... | G01C 21/3415 |
| | | | | 701/432 |
| 2013/0009765 A1* | 1/2013 | Gilman | ............... | B60L 1/003 |
| | | | | 340/455 |
| 2014/0052368 A1* | 2/2014 | Varughese | ............... | B60K 15/00 |
| | | | | 701/123 |

FOREIGN PATENT DOCUMENTS

| | | |
|---|---|---|
| KR | 10-2011-0063139 A | 6/2011 |
| KR | 10-2013-0031013 | 3/2013 |
| KR | 10-2013-0063667 | 6/2013 |

* cited by examiner

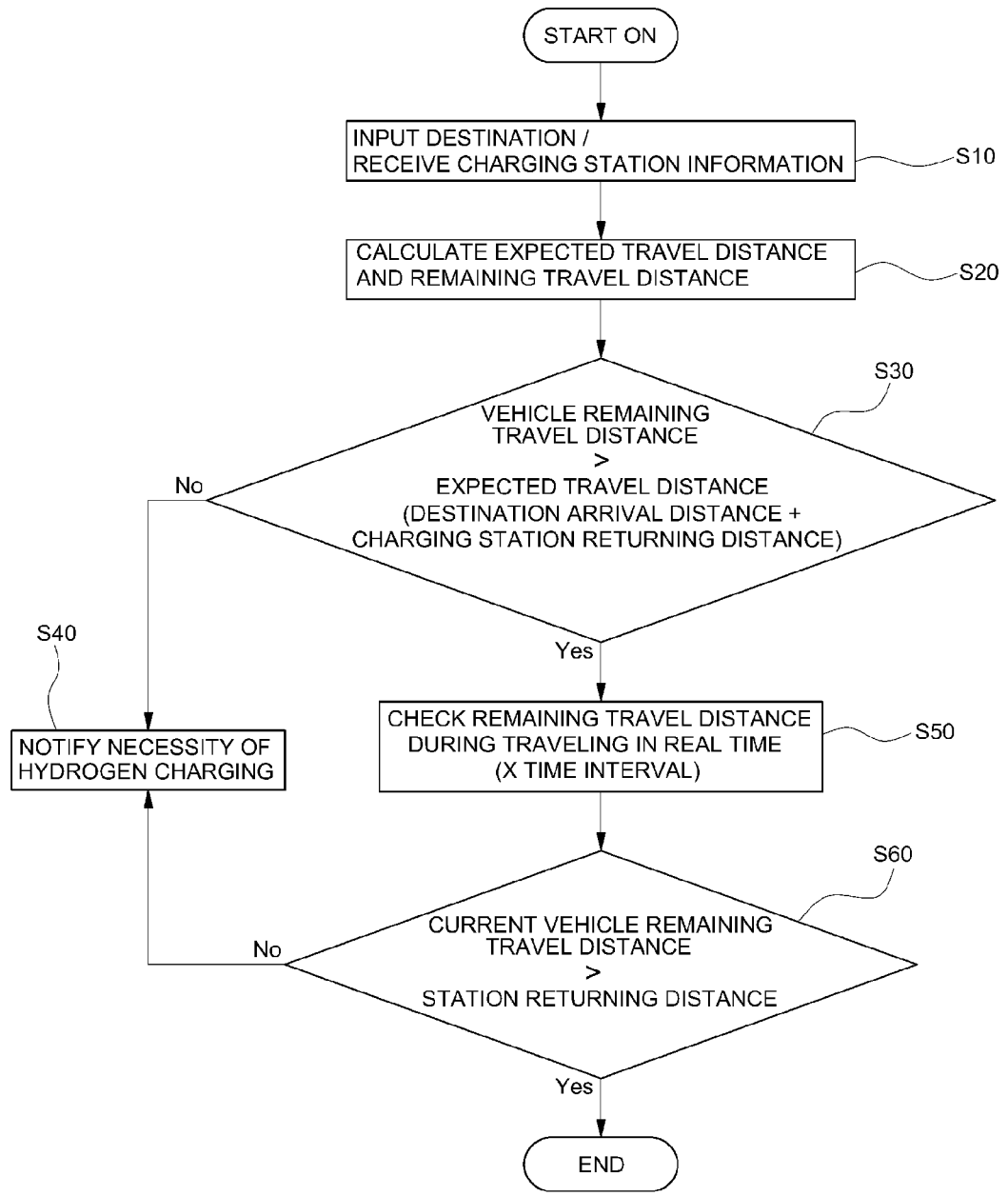

SYSTEM AND METHOD FOR NOTIFYING NECESSITY OF HYDROGEN CHARGING USING RESULT OF MONITORING LOCATION OF HYDROGEN STATION

CROSS-REFERENCE TO RELATED APPLICATION

This application claims under 35 U.S.C. §119(a) the benefit of Korean Patent Application No. 10-2014-0157817 filed on Nov. 13, 2014, the entire contents of which are incorporated herein by reference.

BACKGROUND (a) Technical Field

The present disclosure relates to a method for notifying a user of the need for hydrogen charging through monitoring a location of a hydrogen station and more particularly, to a method for notifying a user of the of the need for charging a vehicle by considering a travelable range using the hydrogen fuel remaining in a vehicle and monitoring the result of the location of surrounding hydrogen stations.

(b) Background Art

A hydrogen fuel cell vehicle drives a motor using an electric charge generated by causing hydrogen and oxygen react with each other using hydrogen as a fuel, thereby generating propulsion force. The hydrogen fuel cell vehicle is typically equipped with a hydrogen storage system, and a high-pressure hydrogen storage system of 700 with highest commercialization performance. Oxygen and hydrogen are supplied to a stack to generate electricity and a vehicle is driven using the electricity as power.

The hydrogen storage portion of the hydrogen fuel cell vehicle compresses and stores hydrogen in a hydrogen tank in the form of a high-pressure gas having a pressure of 70 MPa. The travel distance of the hydrogen fuel cell vehicle is determined by calculating the high-pressure and temperature. Additionally, when a vehicle uses a general gas as a fuel, the remaining travel distance is not displayed since the error range of the pressure measurement is not accurate. However, in the case of the hydrogen fuel cell vehicle, since the infrastructure, (i.e., a hydrogen station) is not popularized or readily available charging of the hydrogen fuel is possible in limited geographic areas. In other words, notification of the remaining travel distance to a customer is an important function.

The lack of available hydrogen stations requires a driver to consider the round-trip distance of the destination and the distance including the distance to and from the hydrogen station. For example, there are frequent occurrences of a vehicle exhausting the hydrogen fuel supply on the way to the charging station and subsequently requiring the vehicle to be towed to the hydrogen charging station for charging. In geographic locations where there is insufficient availability of hydrogen charging stations, it is necessary to provide a charging convenience to the driver in an indirect form to facilitate the commercialization or adaptation of the hydrogen fuel cell vehicles.

The above information disclosed in this section is merely for enhancement of understanding of the background of the invention and therefore it may contain information that does not form the prior art that is already known in this country to a person of ordinary skill in the art.

SUMMARY

The present invention provides notification information regarding a chargeable area to a driver by calculating the remaining travel distance of the vehicle, and may use the position information of the destination and the charging station to calculate the remaining travel distance.

In one aspect, the present invention provides a method for notifying the driver of the necessity for hydrogen charging through position monitoring of a hydrogen station, that may include calculating an expected travel distance from input destination information and calculating the remaining travel distance of a current vehicle from information regarding the currently remaining hydrogen fuel; comparing the calculated expected travel distance to the remaining travel distance of the vehicle; and outputting a warning regarding the necessity of hydrogen charging when the expected travel distance exceeds the remaining travel distance.

In another aspect, the method may further include receiving information regarding a surrounding charging station, prior to calculating the expected travel distance and the remaining travel distance. The method may also include determining the nearest charging station on a route from the received information of the charging station to the destination.

The received information regarding the charging station may include information regarding the general charging capability and information regarding a differential pressure charging capability. In addition, the method may further include determining the nearest charging station on the route to the destination among the charging stations and excluding the charging stations incapable of performing charging (e.g., stations that do not provide charging).

The value of the expected travel distance may be determined by summing a destination arrival distance required to reach the destination and a charging station returning distance required to arrive at a charging station determined to be the nearest charging station. Further, the method may include calculating the remaining travel distance of the vehicle during traveling in real time; comparing the remaining travel distance calculated in real time with the charging station returning distance required to arrive at the nearest charging stations from the current position; and outputting a warning of the necessity for hydrogen charging when the charging station returning distance detected in real time, exceeds the remaining travel distance calculated in real time.

Accordingly, the driver may be immediately notified with information regarding the necessity for charging while traveling, by determining whether the distance may be traveled without charging from the destination information input during traveling. Further, since information regarding the operation of the charging stations may be registered on various web sites, and information required for charging may be provided based thereon, it may be possible to prevent inclusion of a non-charging situation in the route due to the failure or unavailability of the charge situation in advance.

BRIEF DESCRIPTION OF THE DRAWINGS

The above and other features and advantages of the present disclosure will be more apparent from the following detailed description taken in conjunction with the accompanying drawings.

FIG. 1 is a flow chart that illustrating an exemplary embodiment of a method for notifying of the necessity for hydrogen charging through monitoring a position of a hydrogen station according to the present invention.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, In order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Although an exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as a non-transitory computer readable media on a computer readable medium containing executable program instructions executed by a processor, controller/control unit or the like. Examples of the computer readable mediums include, but are not limited to, ROM, RAM, Compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An exemplary embodiment described herein, relates to a method for notifying the driver when charging is required that is determined by the calculated remaining travel distance of the vehicle, by utilizing the position information of the charging station and the position information of the destination. In particular, the present exemplary embodiment, provides a technique that considers the total travel distance of the destination. When the total travel distance is determined to exceed the remaining travel distance of the vehicle, the driver may be notified of the need to initiate charging of the vehicle. In other words, the driver may be notified of the need to charge a vehicle during the initial traveling range, before traveling beyond the range of the rechargeable returning distance.

FIG. 1 is a flow chart that illustrates an exemplary embodiment of a method for notifying of the necessity for hydrogen charging through monitoring the position of a hydrogen station according to an exemplary embodiment. The process discussed herein below may be executed by a controller. The exemplary embodiment provides a method for determining the necessity of hydrogen charging, by calculating an expected travel distance using the destination information input by a driver through navigation, and comparing the calculated expected travel distance to a calculated value of the remaining travel distance.

As illustrated in FIG. 1, the expected travel distance may be determined from the destination arrival distance (e.g. the distance to the destination as determined from the current location), and the charging station returning distance required to arrive at the charging station. Further, the remaining travel distance of the vehicle may be obtained by calculating the distance that the vehicle may travel by a quantity of hydrogen fuel currently remaining in the vehicle. Additionally it may be possible to calculate the remaining travel distance utilizing the current pressure and temperature of the hydrogen tank.

However, upon implementing the method for notifying the driver of the necessity for hydrogen charging by monitoring the position of the hydrogen station, calculating the remaining travel distance may not be limited (e.g. fixed). For example, the remaining travel distance may be updated and calculated based on the changing positon of the hydrogen system and the travel distance. Therefore, the method for calculating the remaining travel distance may be used in various forms other than the type discussed herein, and should not be interpreted only as the type presented herein.

Referring to FIG. 1, the method for notifying the driver of the necessity for hydrogen charging through monitoring the position of the hydrogen station according to an exemplary embodiment, may include a process executed to determine whether hydrogen charging is required by considering the destination information input from the driver. To determine whether the hydrogen charging is required, the method may include generating a travel route based on the destination information that corresponds to the destination input (S10) to calculate an expected travel distance along the generated travel route, and calculating the remaining travel distance from the current hydrogen fuel information (S20).

The calculated expected travel distance may be compared to the calculated remaining travel distance, and whether there is a need for charging may be determined based on the comparison result (S30). For example, necessity for charging may be determined, when the expected travel distance of one-way 150 km from point A to point B is calculated and the remaining travel distance is calculated as about 170 km, therefore, it may be determined that there is no need for charging. Alternatively, when the remaining travel distance is calculated as about 130 km, it may be determined that there is a need for charging. However, the travel distance may be impacted or may provide limited information in consideration of the road conditions. For example, the driving conditions such as whether to drive on a highway or whether to operate an air-conditioner or a heater may impact the process of calculating the remaining travel distance.

Moreover, as described in the above example, although the expected travel distance from point A to point B may be considered as the expected travel distance, a schedule (e.g. travel route) may be considered that returns to a departure point or a third region after visiting the destination. In particular, a traveling route may be selected which includes the above-descried destination as a transit point, and additionally includes the final destination. Further, in another exemplary embodiment of the present invention, upon calculating the expected travel distance, it may be possible to further consider the charging station returning distance required to arrive at the charging station may be considered. In other words, when the hydrogen stations are located at specific (e.g. very limited) locations; there may be a risk that it is not possible to reach the charging station when traveling on another travel route after reaching the destination. For example, when the expected travel distance of one-way about 150 km from point A to point B is calculated as in the above-mentioned example, the remaining travel distance may be calculated as about 170 km. The distance from the charging station proximate to the destination may be about 30 km, in some cases the fuel may be exhausted prior to reaching the charging station.

In an exemplary embodiment of the disclosure, it may possible to calculate a value obtained by summing the charging station returning distance and the destination arrival distance as the expected travel distance including the returning distance to the nearby charging station on the route. For example, the destination arrival distance and the charging station return distance describe the respective factors considered. Upon implementing an exemplary embodiment, a method may be used for indicating the charging station as a transit point, and generating an optimal route of reaching the destination via the charging station, and thereafter, calculating the expected travel distance to the route.

Furthermore, the charging station information may use the charging station information stored in a navigation system. However, it may be implemented so that the operating information concerning the charging stations may be received from an external source. Accordingly, the available charging stations may be selected, and the nearest charging station or the charging station requiring the least travel duration among the selected charging stations may be selected (e.g. included or added) to generate the route. The method may include receiving information regarding the charging station locations. (S10). In other words, in this exemplary embodiment, the method may be configured to include receiving the charging station information present in the vicinity of the route to the destination or the charging station information proximate to the departure point apart from the destination information from the external source. The charging station information may be used in the process of determining the optimum charging station on the route. For example, when the destination information is input by the driver, a variety of travel routes including the optimal travel route may be generated based on the destination information, and the charging station information adjacent to the travel path may be received. In an alternate exemplary embodiment, it may also be configured to receive information concerning all of the charging stations in the vicinity of the departure point and the destination without considering the travel route.

The receiving of the charging station information may include receiving information regarding the operating status of the charging station of the web sites operated separately and to process the information received through the subsequent steps to the driver. For example, a web site may disclose the operating status of the charging stations of Western California region of North America, (e.g. "m.cafcp.org" or the like), and the charging station information may be received via the web site. For example, a web site may disclose the operating statuses of the nine charging stations of Western California region dividedly into two stages. The two stages may include an on-line capacity capable of performing the charging and an off-line capacity incapable of performing the charging. In some instances several charging stations may be incapable of performing the charging due to frequent failure of a boost compressor of the charging station, according to an exemplary embodiment of the present invention, may be divided into three steps including whether differential pressure charging using the differential pressure between the charging station and the vehicle is available.

Therefore, in the process of determining the nearest charging station on the route from the information regarding the received charging station to the destination, it may be possible to use various types of information to determine the optimal charging station. For example, one exemplary embodiment may use the information regarding the charging station capable of performing the general charging. The optimal charging station may be determined by including the information regarding the charging station capable of performing the differential pressure charging, in consideration of the three divided categories. In other words, the charging station capable of performing the general charging, the charging station capable of performing the differential pressure charging, and the charging station incapable of performing the charging may be considered when determining the optimal charging station. When the available charging station is identified, then it may be determined whether charging is required may be determined through subsequent steps. The subsequent steps may compare the expected travel distance in consideration of the charging station returning distance to the charging station to the remaining travel distance of the vehicle, and provide a notification of the necessity for hydrogen charging to a driver (S40).

In another aspect of this exemplary embodiment, the method may include steps determining whether the notification of the necessity for hydrogen charging includes traveling conditions reflected in real time during traveling, and in response to determining that there is a need for charging alerting the driver (S60). In particular, the remaining travel distance of the current vehicle may be checked in real time (S50). The travel distance may be compared to the returning distance up to the nearest charging station, and when the remaining travel distance is less than the charging station returning distance that hydrogen charging may be determined to be required, and a notification may be provided to the driver. At this time, the notification function may be implemented as a function of providing notification information regarding the nearby charging station together with a message indicating necessity of charging on a display window of a cluster window, and it may be configured to provide such display information together with a warning sound. While this disclosure has been described in connection with what is presently considered to be exemplary embodiments, it is to be understood that the present disclosure is not limited to the disclosed exemplary embodiments but on the contrary, is intended to cover various modifications and equivalent arrangements included within the spirit and scope of the accompanying claims. In addition, it is to be considered that all of these modifications and alterations fall within the scope of the present disclosure.

What is claimed is:

1. A method for notifying of a necessity for hydrogen charging through position monitoring of a hydrogen station, the method comprising:
   receiving, by a controller, information regarding a surrounding charging station;
   determining, by the controller, a nearest charging station on a route toward a destination among charging stations except a charging station incapable of performing charging;
   calculating, by the controller, an expected travel distance from input destination information and calculating a remaining travel distance of a current vehicle from information regarding the currently remaining hydrogen fuel;
   comparing, by the controller, the calculated expected travel distance to the remaining travel distance of the vehicle; and
   outputting on a display device a warning by the controller of the necessity for hydrogen charging when the expected travel distance exceeds the remaining travel distance,
   wherein the received information of the charging station includes information retarding a charging capability and information regarding a differential pressure charging capability.

2. The method of claim 1, wherein the expected travel distance is determined as a value by summing a destination arrival distance required to reach the destination and a charging station returning distance required to arrive at a charging station determined to be nearest.

3. The method of claim 1, further comprising:
   calculating, by the controller, the remaining travel distance of the vehicle during traveling in real time;
   comparing, by the controller, the remaining travel distance calculated in real time to the charging station returning distance required to arrive at the nearest charging station from the current position; and
   outputting, by a controller, warning necessity of the hydrogen charging when the charging station returning distance detected in real time exceeds the remaining travel distance calculated in real time.

4. A system for notifying of a necessity for hydrogen charging through position monitoring of a hydrogen station, the system comprising:
   a memory configured to store program instructions; and
   a processor configured to execute the program instructions, the program instructions when executed are configured to:
      receive information regarding a surround charging station;
      determine a nearest charging station on a route toward a destination among charging stations except a charging station incapable of performing charging;
      calculate an expected travel distance from input destination information and calculating a remaining travel distance of a current vehicle from information regarding the currently remaining hydrogen fuel;
      compare the calculated expected travel distance to the remaining travel distance of the vehicle; and
      output on a display device a warning of the necessity for hydrogen charging when the expected travel distance exceeds the remaining travel distance,
      wherein the received information of the charging station includes information regarding a charging capability and information regarding a differential pressure charging capability.

5. The system of claim 4, wherein the processor determines the expected travel distance as a value by summing a destination arrival distance required to reach the destination and a charging station returning distance required to arrive at a charging station determined to be nearest.

6. A non-transitory computer readable medium containing program instructions executed by a controller, the computer readable medium comprising:
   program instructions that receive information regarding a surrounding charging station;
   program instructions that determine a nearest charging station on a route toward a destination among charging stations except a charging station incapable of performing charging;
   program instructions that notify of a necessity for hydrogen charging through position monitoring of a hydrogen station;
   program instructions that calculate an expected travel distance from input destination information and calculate a remaining travel distance of a current vehicle from information regarding the currently remaining hydrogen fuel;
   program instructions that compare the calculated expected travel distance to the remaining travel distance of the vehicle; and
   program instructions that output on a display device a warning by the controller of the necessity for hydrogen charging when the expected travel distance exceeds the remaining travel distance,
   wherein the received information of the charging station includes information regarding a charging capability and information regarding a differential pressure charging capability.

* * * * *